United States Patent
Katsumi

[19]

[11] Patent Number: 6,094,214
[45] Date of Patent: Jul. 25, 2000

[54] MULTIPLE-POINT TELEVISION MEETING SYSTEM AND RECORDING MEDIUM HAVING RECORDED MULTIPLE-POINT TELEVISION MEETING CONTROL PROGRAM THEREIN

[75] Inventor: Teruo Katsumi, Tokyo, Japan

[73] Assignee: NEC Corporation, Tokyo, Japan

[21] Appl. No.: 09/186,095

[22] Filed: Nov. 5, 1998

[30] Foreign Application Priority Data

Jun. 11, 1997 [JP] Japan .................................... 9-304300

[51] Int. Cl.[7] ...................................................... H04N 7/14
[52] U.S. Cl. ............................ 348/15; 348/14; 379/93.21
[58] Field of Search .................... 348/14, 15; 379/93.21, 379/202; 370/260; 395/200.34

[56] References Cited

U.S. PATENT DOCUMENTS

| | | | |
|---|---|---|---|
| 5,680,392 | 10/1997 | Semaan ...................................... | 348/15 |
| 5,689,553 | 11/1997 | Ahuja et al. ............................. | 379/202 |

FOREIGN PATENT DOCUMENTS

| | | |
|---|---|---|
| 56-100556 | 8/1981 | Japan . |
| 62-164458 | 7/1987 | Japan . |
| 63-18733 | 1/1988 | Japan . |
| 63-99664 | 4/1988 | Japan . |
| 4-35184 | 2/1992 | Japan . |
| 4-286257 | 10/1992 | Japan . |
| 4-286258 | 10/1992 | Japan . |
| 6-261314 | 9/1994 | Japan . |
| 6-276513 | 9/1994 | Japan . |
| 7-184183 | 7/1995 | Japan . |
| 7-212353 | 8/1995 | Japan . |
| 8-191349 | 7/1996 | Japan . |
| 8-297637 | 11/1996 | Japan . |
| 8-316953 | 11/1996 | Japan . |
| 8-317367 | 11/1996 | Japan . |

*Primary Examiner*—Curtis A. Kuntz
*Assistant Examiner*—Melur Ramakrishnaiah
*Attorney, Agent, or Firm*—Whitham, Curtis & Whitham

[57] ABSTRACT

A meeting terminal opens a meeting by transmitting meeting setting information through a channel to a meeting state control section located within a control section of a multiple-point television meeting control device. The meeting setting information includes a mode, a name of a meeting and a password. The meeting state control section sets a meeting to a channel interface section and sets a password to a meeting terminal authentication section. A meeting terminal intending to attend the meeting connects a channel to the multiple-point television meeting control device and then transmits a password from a password posting section. The meeting terminal authentication section checks the received password, and makes a meeting terminal connection request to a channel interface section if the received password coincides with the password set at the time of opening the meeting. With this arrangement, the security of the multiple-point television meeting system is improved and it becomes possible to achieve an opening of a meeting with small load of a host terminal.

10 Claims, 2 Drawing Sheets

MULTIPLE-POINT TELEVISION MEETING SYSTEM AND RECORDING MEDIUM HAVING RECORDED MULTIPLE-POINT TELEVISION MEETING CONTROL PROGRAM THEREIN

BACKGROUND OF THE INVENTION

1. Field of the Invention

The present invention relates to a multiple-point television meeting system with at least three television meeting terminals for transmitting and receiving video signals, voice signals and data through communication channels and a multiple-point television meeting control device for controlling a communication meeting by processing video signals, voice signals and data that have been transmitted and by transmitting and receiving signals to and from the television meeting terminals.

2. Related Art

Conventionally, this type of multiple-point television meeting system has been used for the purpose of increasing the security of a multiple-point television meeting by avoiding an unauthorized attendance at the meeting. For example, there has been described in Japanese Patent Application Laid-open No. 6-261314 a multiple-point television meeting system in which when a host terminal (a chairman terminal) has made a request to a multiple-point television meeting control device for opening a meeting, there is established a two-directional data channel and a one-directional video and voice channel between the multiple-point television meeting control device and each meeting attending terminal to thereby enable the chairman terminal to check attendants.

Further, this type of multiple-point television meeting system is used for the purpose of opening a multiple-point television meeting smoothly and in a simple operation while improving the security of the multiple-point television meeting. For example, there has been described in Japanese Patent Application Laid-open No. 6-276513 a multiple-point television meeting system in which a pre-registered chairman terminal calls a meeting by a batch assignment using registered group numbers thereby to improve the security in a simple operation.

However, according to the conventional multiple-point television meeting system for improving the security of a meeting, a meeting is held under the leadership of a host terminal or a chairman terminal and a check operation is carried out by the host terminal or the chairman terminal. This has a problem that the host terminal or the chairman terminal has to bear a large load and a meeting cannot be opened if the host terminal or the chairman terminal does not attend the meeting.

SUMMARY OF THE INVENTION

It is an object of the present invention to provide a multiple-point television meeting system which makes it possible to open a television meeting with improved security without requiring a host terminal or a chairman terminal to check terminals attending the meeting or without a need for an attendance of the host terminal or the chairman terminal.

According to a multiple-point television meeting system of the present invention, a television meeting terminal has authentication posting means for posting an authentication at the time of attending a meeting, and a multiple-point television meeting control device has meeting terminal authentication means for checking whether a posted authentication is a predetermined authentication when a television meeting terminal attends a meeting and meeting state control means for setting a meeting connection according to a mode of the meeting included in meeting setting information at the time of opening a meeting or prior to the opening of a meeting, setting a predetermined authentication to the meeting terminal authentication means and, when it has been posted that a posted authentication coincides with the predetermined authentication, connecting the authentication-posting television meeting terminal to the television meeting.

As an authentication is set at the time of opening a meeting and an acceptance or a rejection of an attendance is determined by the authentication, it becomes possible to open the meeting with improved security. Further, as the security has been obtained by the confirmation of the authentication, a meeting opening terminal (a host terminal or a chairman terminal) does not necessarily attend the meeting, and an operator (a maintenance staff) can carry out only the opening of the meeting on behalf of the meeting opening terminal.

According to the present invention, a television meeting terminal can further has meeting information setting means for transmitting meeting setting information including a mode of a meeting to be held and authentication to the multiple-point television meeting control device after connecting channels to the multiple-point television meeting control device at the time of opening the meeting or prior to the opening of the meeting.

According to the present invention, the meeting state control means can request a television meeting terminal to input again an authentication if an authentication posted by this television meeting terminal does not coincide with a predetermined authentication, and can disconnect this television meeting terminal from the multiple-point television meeting control device if a state that an authentication posted thereafter does not coincide with the predetermined authentication continues by a predetermined number of times.

According to the present invention, a maintenance staff or an operator of the multiple-point television meeting control device can input meeting setting information and the predetermined authentication.

According to the present invention, when an authentication sent by a television meeting terminal has been received, the meeting terminal authentication means can set the meeting information control means so that the meeting setting information received from this television meeting terminal becomes effective, thereby being able to limit meeting terminals that can attend the meeting.

According to the present invention, the multiple-point television meeting system can be structured such that when a plurality of meetings are being held, the meeting terminal authentication means can check which one of predetermined authentication of the meetings currently being held a posted authentication coincides with and that the meeting state control means can control to connect an authentication-posting television meeting terminal to an authentication-coincided meeting.

According to the present invention, a plurality of meetings are discriminated by authentication set at the time of opening the meetings, and the meetings are allocated by the authentication at the time of attending the meetings. In this case, when the name of a meeting is posted to a television meeting terminal, this television meeting terminal can also confirm the attendance to the object meeting.

According to the present invention of claim 1, it is not necessary for a host terminal or a chairman terminal to check meeting attending terminals to thereby reduce the load of the host terminal or the chairman terminal. Therefore, it is possible to open a meeting with improved security. Further, it is also possible to open a meeting efficiently with improved security even if the host terminal or the chairman terminal does not attend the meeting.

Further, according to the present invention of claim 5, it is possible to structure a system with improved security of the application of the multiple-point television meeting control device itself.

Further, according to the present invention of claim 6, it is possible to make attendance of meetings by a consistent operation from a meeting terminal even if a plurality of meetings are held by the multiple-point television meeting control device.

DETAILED DESCRIPTION OF THE PREFERRED EMBODIMENTS

Preferred embodiments of the present invention will be explained in detail below with reference to the attached drawings.

Figure 1:
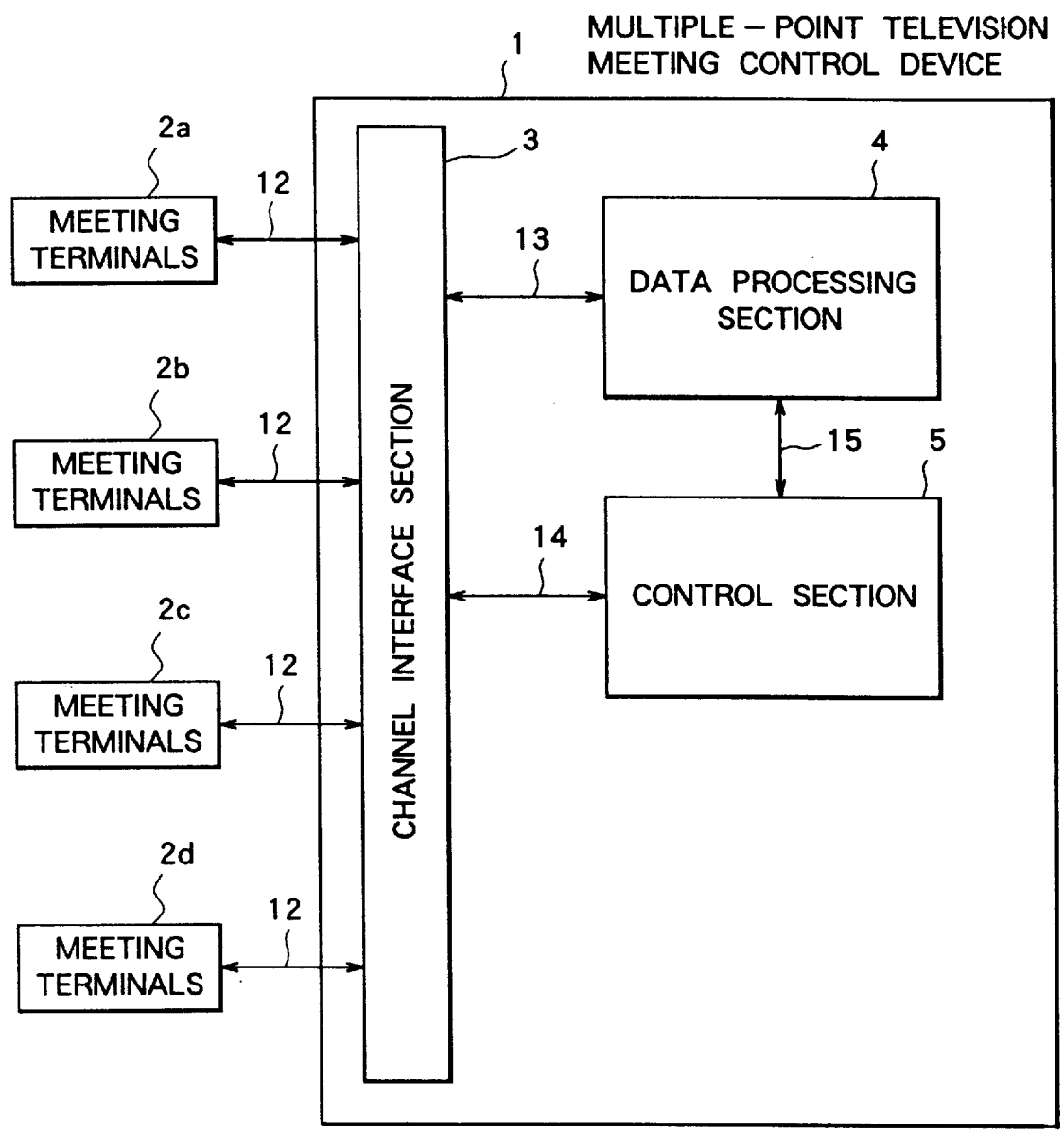
FIG. 1 is a block diagram for showing a multiple-point television meeting system according to a first embodiment of the present invention.

FIG. 1 is a block diagram for showing a first embodiment of the present invention. This shows a multiple-point television meeting system for carrying out communications of data including multiplexed video and voice information, password and meeting setting information between meeting terminals 2a to 2d (hereinafter to be collectively referred to as meeting terminals 2) with a multiple-point television meeting control device 1 through communication channels 12. The multiple-point television meeting control device 1 is structured by a channel interface section 3, a data processing section 4 and a control section 5. The channel interface section 3 separates multiplexed voice and video data received through the communication channels 12 and transmits the separated data to respective processing sections. Particularly, data including password and meeting setting information are transmitted to the data processing section 4 through a line 13. The data processing section 4 takes out password and meeting setting information from the data received through the line 13 and transmits this information to the control section 5 through a line 15. The control section 5 carries out a control of the channel interface section 3 and communications with the meeting terminals 2 through the data processing section 4, based on the password and the meeting setting information received.

Figure 2:
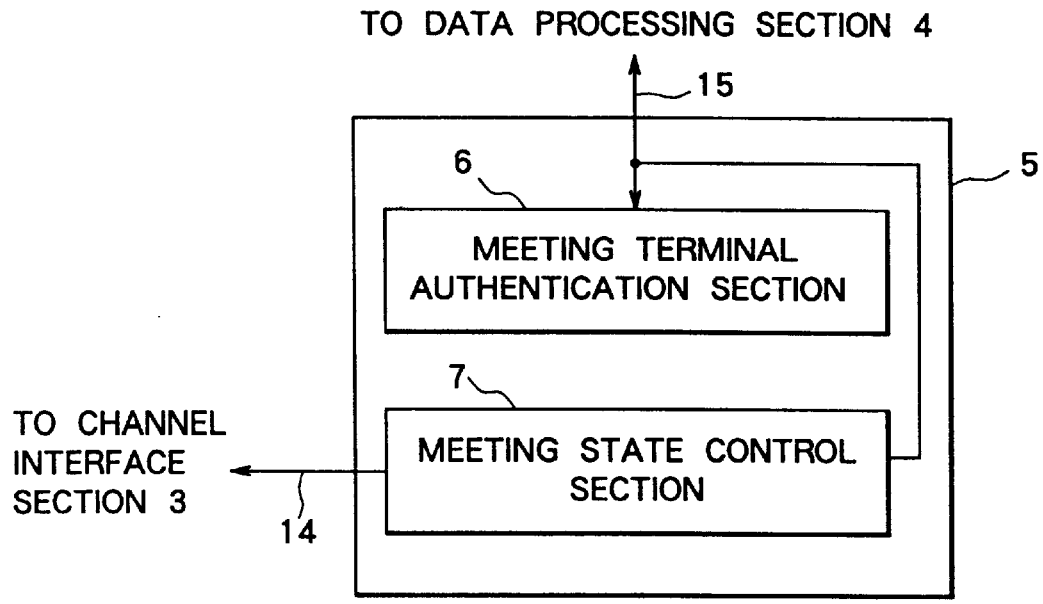
FIG. 2 is a block diagram for showing a control section 5 of a multiple-point television meeting control device 1 in FIG. 1.

FIG. 2 is a block diagram for showing details of the control section 5. The control section 5 is structured by a meeting terminal authentication section 6 and a meeting state control section 7. A password received through the line 15 is sent to the meeting terminal authentication section 6 of the control section 5, and meeting setting information received through the line 15 is sent to the meeting state control section 7. The meeting state control section 7 carries out communications with the channel interface section 3 through the line 14.

Figure 3:
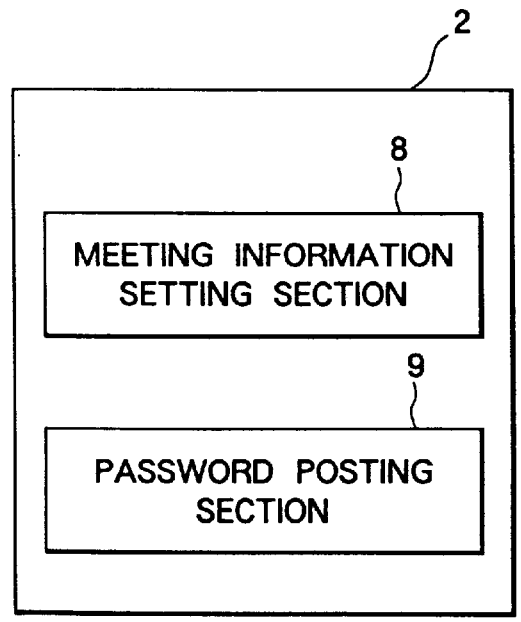
FIG. 3 is a block diagram for showing television meeting terminals 2a to 2d in FIG. 1.

FIG. 3 is a block diagram for showing details of each of the meeting terminals 2 (2a, 2b, 2c and 2d). Each meeting terminal 2 has a meeting information setting section 8 for setting a state of a meeting and a password posting section 9 for transmitting a password at the time of connecting to a meeting.

The operation of the present embodiment will be explained next. The multiple-point television meeting control device 1 is set by the control section 5 to wait for a connection of the television meeting terminals 2 to this device through the channel interface section 3.

The meeting terminal 2a connects the channel to the multiple-point television meeting control device 1 at the time of opening a meeting or prior to the opening of a meeting. After the channel connection, the meeting terminal 2a transmits meeting setting information including a mode of a meeting to be held (that is, a number of meeting attending points, channel speed, etc.), a password and a name of a meeting, from the meeting information setting section 8 to the control section 5 of the multiple-point television meeting control device 1. The meeting setting information is separated by the channel interface section 3 and is sent to the meeting state control section 7 within the control section 5 through the data processing section 4. The meeting state control section 7 sets the channel interface section 3 according to the mode of the meeting included in the meeting setting information and sets the password included in the meeting setting information to the meeting terminal authentication section 6. In this case, the channel interface section 3 is set to wait for a call arrival from a new group of meeting attendants including the meeting terminal 2a. In other words, the channel interface section 3 is set so that the meeting terminals 2b to 2d cannot attend the meeting held by the meeting terminal 2a by just only connecting their channels to the multiple-point television meeting control device 1.

In order for the meeting terminals 2b to 2d to be able to attend the meeting held by the meeting terminal 2a, the meeting terminals 2b to 2d have to send their passwords from the password posting section 9 to the meeting terminal authentication section 6 within the multiple-point television meeting control device 1, after the channel connection to the multiple-point television meeting control device 1. Upon receiving a password, the meeting terminal authentication section 6 checks if this password coincides with a password set in advance by the meeting state control section 7. If the received password coincides with the set password, the meeting terminal authentication section 6 sends a meeting terminal connection request to the meeting state control section 7 so as to connect the corresponding meeting terminal to the corresponding meeting (that is, a change-over of data image, an addition of voice, etc.). The meeting state control section 7 sets the channel interface section 3 based on the meeting terminal connection request, and connects the corresponding meeting terminal to the meeting held by the meeting terminal 2a. If the received password does not coincide with the set password, the meeting terminal authentication section 6 makes a request to the corresponding meeting terminal to input the password again. If the resent password does not coincide with the set password three time, for example, the meeting terminal authentication section 6 sends a meeting terminal disconnection request to the meeting state control section 7, to thereby disconnect the corresponding meeting terminal. With this arrangement, only meeting terminals whose password authentication has passed can attend the meeting held by the meeting terminal 2a, so that the meeting can be opened with improved security.

Further, since the meeting terminal 2a does not need to attend the meeting by only opening the meeting in this case, it may arranged such that a maintenance staff or an operator, for example, carries out only the processing of the opening of the meeting and sets the multiple-point television meeting control device 1 in a state to be able to open a meeting so that the meeting can be opened with improved security by merely allowing attending terminals to connect channels and input passwords. Further, it is also possible to open a meeting without a connection from the meeting terminal 2a by connecting a control console directly to the multiple-point television meeting control device 1 for communicating with the control section 5, so that a maintenance staff or an operator opens the meeting based on this arrangement.

A finishing of a meeting will be explained next. For finishing a meeting, the meeting can be finished automatically at an assigned time if the meeting terminal 2a includes the assigned finishing time information in the meeting setting information at the time of opening the meeting. The meeting state control section 7 monitors time and makes a meeting terminal disconnection request to the channel interface section 3 at an assigned time so that the meeting can be finished. If a finishing time is not assigned at the time of opening the meeting, the meeting terminal 2a can make a meeting finish request from the meeting information setting section 8 at the time of finishing the meeting so that the meeting can be finished.

A second embodiment of the present invention will be explained next. While description has been made of the case in the first embodiment that the meeting terminal 2a transmits meeting setting information from the meeting information setting section 8 by merely connecting the channel to the multiple-point television meeting control device 1 at the time of opening a meeting, description will be made for the second embodiment where an input of a password is necessary in opening a meeting.

For opening a meeting, the meeting terminal 2a connects the channel to the multiple-point television meeting control device 1. After the channel connection, the meeting terminal 2a transmits a password for opening the meeting from the password posting section 9. Upon receiving a predetermined password for opening the meeting from the meeting terminal 2a, the meeting terminal authentication section 6 within the multiple-point television meeting control device 1 sets the meeting state control section 7 to make effective the meeting setting information received from the meeting terminal 2a.

With the above arrangement, it is possible to structure a television meeting system that can open a meeting with more improved security by limiting meeting terminals that can open a meeting.

A third embodiment of the present invention will be explained next. The operation of allocating attending meetings based on password when a plurality of meeting are being held in the first and second embodiments will be explained.

It is assumed that a plurality of meetings are being held at present according to the method of the first or second embodiment. Description will be made of the case where there exist meetings held by the meeting terminal 2a and the meeting terminal 2b, for example. The meeting terminal 2c transmits a password from the password posting section 9 after connecting the channel to the multiple-point television meeting control device 1. The meeting terminal authentication section 6 checks if the received password coincides with a password of the meeting held by the meeting terminal 2a or the meeting terminal 2b. If the received password coincides with the password of the meeting held by the meeting terminal 2a, the meeting terminal authentication section 6 makes a meeting terminal connection request to the meeting state control section 7. In this case, as the meeting terminal authentication section 6 and the meeting state control section 7 can recognize that the password is for the meeting held by the meeting terminal 2a, it is possible to make a meeting terminal connection request to the channel interface section 3 to connect the meeting terminal 2c to the meeting held by the meeting terminal 2a. Further, when the name of the meeting attended is sent to the meeting terminal 2c as an additional function, the meeting terminal 2c can also confirm that this terminal has attended the object meeting. The above explanation also applies to the case where the password coincides with the password of the meeting held by the meeting terminal 2b. If the received password does not coincide with any one of the set passwords, a re-input of the password or a channel disconnection processing is carried out in a manner similar to that of the first embodiment.

It is also possible to arrange such that the processing of the control section 5 is recorded in a recording medium such as a CD-ROM, a FD or the like as a multiple-point television meeting control program, and this program is executed by CPU or the like.

What is claimed is:

1. A multiple-point television meeting system, comprising:
   at least three television meeting terminals for transmitting and receiving video signals, voice signals and data through communication channels,
      said television meeting terminals having authentication posting means for posting an authentication at the time attending a meeting; and
   a multiple-point television meeting control device for controlling a communication meeting by processing video signals, voice signals and data that have been transmitted and by transmitting and receiving this information to and from said television meeting terminals,
      said multiple-point television meeting control device having
         meeting terminal authentication means for checking whether a posted authentication is a predetermined authentication when any one of said television meeting terminals attends a meeting, and
         meeting state control means for setting a meeting connection according to a mode of the meeting included in meeting setting information at the time of opening the meeting or prior to the opening of the meeting, setting a predetermined authentication to said meeting terminal authentication means and, when it has been posted that a posted authentication coincides with said predetermined authentication, connecting said authentication-posting television meeting terminal to the television meeting.

2. A multiple-point television meeting system according to claim 1, wherein each of said television meeting terminal further has meeting information setting means for transmitting meeting setting information including a mode of a meeting to be held and authentication to said multiple-point television meeting control device after connecting a channel to said multiple-point television meeting control device at the time of opening the meeting or prior to the opening of the meeting.

3. A multiple-point television meeting system according to claim 1, wherein said meeting state control means requests a television meeting terminal to input again an authentication if an authentication posted by this television meeting terminal does not coincide with a predetermined authentication, and disconnects said television meeting terminal from said multiple-point television meeting control device if a state that an authentication posted thereafter does not coincide with said predetermined authentication continues by a predetermined number of times.

4. A multiple-point television meeting system according to claim 1, wherein a maintenance staff or an operator of said multiple-point television meeting control device inputs said meeting setting information and said predetermined authentication.

5. A multiple-point television meeting system according to claim 1, wherein when an authentication received from any one of said television meeting terminals is a predetermined authentication, said meeting terminal authentication means sets said meeting information control means to make effective said meeting setting information received from said television meeting terminal.

6. A multiple-point television meeting system according to claim 1, wherein when a plurality of meetings are being held, said meeting terminal authentication means checks which one of predetermined authentication of said meetings currently being held a posted authentication coincides with, and said meeting state control means controls to connect an authentication-posting television meeting terminal to an authentication-coincided meeting.

7. A multiple-point television meeting system according to claim 6, wherein said meeting state control means transmits a name of a meeting to a television meeting terminal whose authentication has coincided with a predetermined authentication.

8. A multiple-point television meeting system according to claim 1, wherein said meeting state control means disconnects a television meeting terminal attending a meeting at a meeting finishing time included in said meeting setting information.

9. A multiple-point television meeting system according to claim 1, wherein said meeting state control means disconnects a television meeting terminal attending a meeting at a meeting finishing request from said television meeting terminal who opened the meeting if said meeting setting information does not include a meeting finishing time.

10. A multiple-point television meeting system according to claim 1, wherein said authentication is a password.

* * * * *